R. K. Crolle.
9507X
Evaporating Pan.
Patented Mar. 18, 1836.
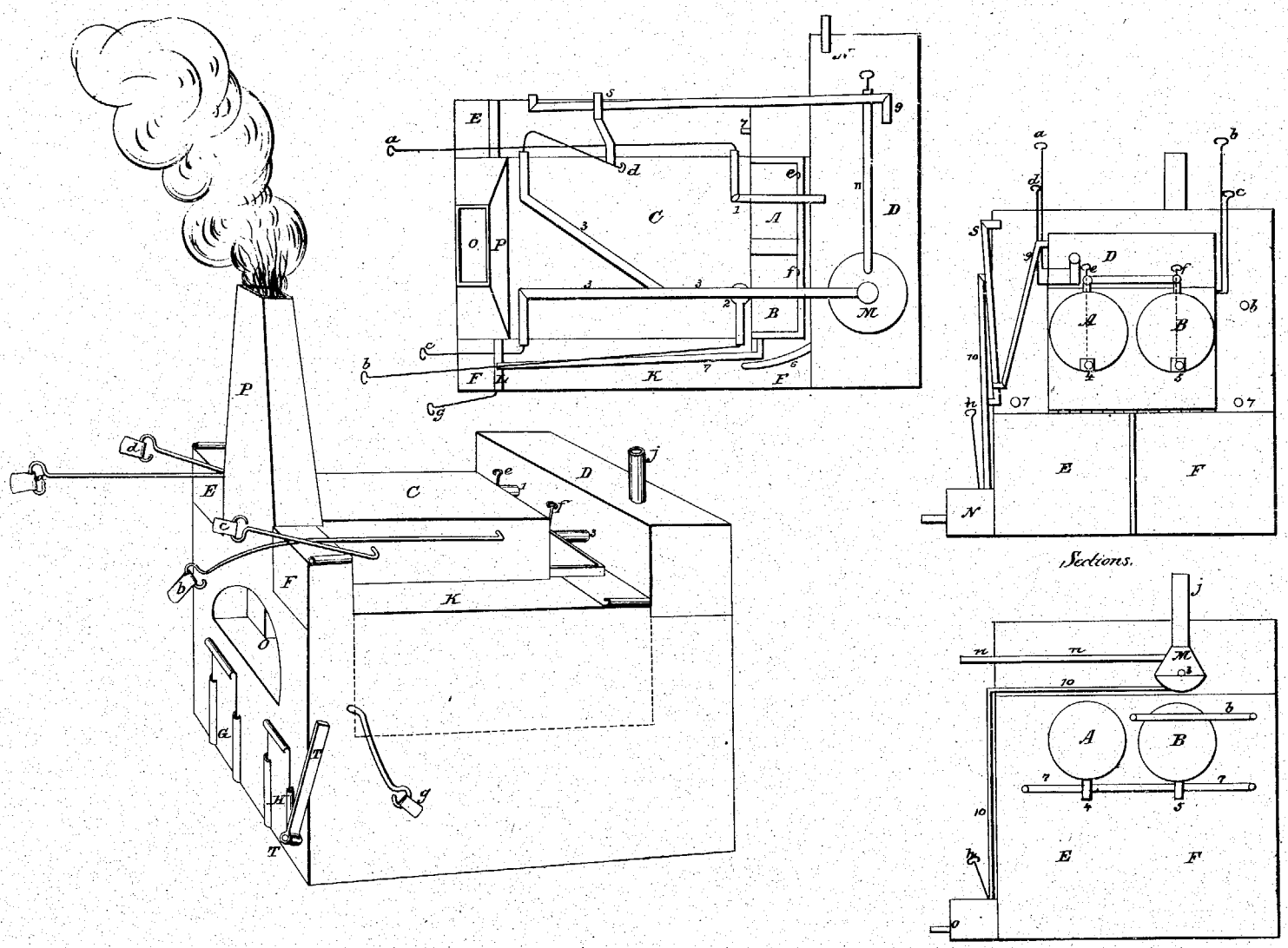

9507X Mar 18, 1836 [illegible] 15 365.

Richard K. Cralle of Lynchburg. Virginia.
Letters Patent.

The schedule referred to in these Letters Patent and making part of the same containing a description in the words of the said Richard K. Cralle himself of his improvement in the manufacture of coarse and common salt from salt water, To all to whom these presents shall come, Be it known that I Richard K. Cralle of the town of Lynchburg County of Campbell and State of Virginia, have invented a new and useful machine and improvement in the manufacture of coarse and common salt from salt water, and that the following is a full and exact description thereof.
Two boilers of any desired dimensions are constructed of cast or sheet iron or copper and fixed parallel to each other, at a few inches distance from each other in strong mason or brick work, and elevated about four inches at the ends next the grates where the flues from them enter into the chimney, or are continued in funnels. The lower ends of these boilers pass through the wall upon which they rest about eight inches, and the flues enter them first at the wall and pass upwards to the chimney. These boilers are represented in the annexed drawings which are to be taken as a part of this specification by the letters A & B, immediately above them is a cistern extending from the chimney to the wall on which the lower ends rest; the bottom being of sheet iron or copper coming in contact with the boilers themselves may form a part of the bottom. This cistern is designated in the drawings by the letter C, at the lower ends of the boilers is another cistern referred to in the drawings by the letter D, the bottom of which may be on a level with the boilers. These cisterns are covered to keep out rain. In the plan represented in the drawing the boilers are supposed to be elevated about thirty two feet above the ground. This however is not necessary as will appear presently. The elevation is taken only for better illustration. The space below the boilers is divided into two principal apartments, the one under boiler A for a settling cistern, the other under boiler B, as a receiver of the salt. The first or settling cistern is designated in the drawings by the letter E, the second or receiver by the letter F, they run the whole length of the furnace not only below the boilers, but also below the cistern D. which forms in part a cover for them. They are divided from each other by a wall running the whole length under the boilers, the arches from which make the floor of the boilers.

The two doors designated in the drawings by the letter G and H, serve as entrances to them. The upper part of these two cisterns or receivers, rise upon a level with the upper part of the boilers, two other settling cisterns are constructed at the sides, on a level with the floor, of the furnace, the bottoms of which serve in part as covers to the cistern and receiver below which are described above, These two last cisterns are referred to in the drawings by the letters I and K, the latter having a small appartment at one end designated by the letter L. All these cisterns, the two first excepted are to be made perfectly tight. This may be done by lining them with sheet iron, copper, tin, or lead, or other wise by wood and well filled in between the wood and the brick walls, surrounding them.

Each of the boilers have three pipes inserted into them, one to supply them with water called the supply pipe. one to carry off the vapour called the vapour pipes, and one to empty their contents, called the discharge pipes.

The supply pipes are inserted about two feet from the [base] ends of the boilers. and passing from the cistern D, into cistern C, and through its floor into boiler A, referred to in the drawings by the figure 1, and serves to convey by means of its stop cock marked a the salt water from cistern D to boiler A, The other passes immediately down through the floor of cistern C, into boiler B, and serves to convey by means of its stop cock, marked b, the brine from this last cistern into the boiler B.

This pipe is designated in the drawings by the figure 2. The vapour pipes rise from the ends of the boilers and passes along the bottom of cistern C, they unite together and passing through the end of this cistern they enter into cistern D, and there connected with the condenser, which is referred to in the drawings by the letter M, These vapour pipes are designated in the drawings by the figures 3. 3. 3. and their stop cocks by the letter c, and d, The discharge pipes are inserted below the boilers, about

9507X six inches or less from the lower ends, and serve to convey by means of their stop cocks marked e, and f. the brine from them into the settling cistern and receiver below These pipes are designated in the drawings by the figures 4 and 5. there is a pipe passing from the large settling cistern E into the small cistern K. also another leading from the compartment, L around the end of the boiler to the cistern I on the other side under the regulation of the stop cock, marked in the drawings by the letter g. the first of these pipes is referred to in the drawings by the figure 6 the second by figure 7. These pipes serve to convey the brine from one cistern to another until it reaches the cistern I cleared of its impurities. From this last cistern a pipe marked in the drawings by the figure 8. leads up into cistern C, and a force pump at the end throws the brine up, from it into this cistern Another pipe leads up into cistern D, through which the salt water is in the first place drawn by a force pump from the well or spring into the cistern D, this pipe is referred to in the drawings by the figure 9.

There is another pipe leading from the bottom of the condenser M, down the side of furnace or wall to the bottom where it ends in a small water box marked N in the drawings with a cock marked k. A small aperture about six inches above the bottom of this box serves to let out the water from the condensor, This last mentioned pipe must be about thirty three or four feet in height, measured from the end in the water box to its insertion in the condensor, It is designated in the drawings by the figures 10. The condensor may be about two feet in mean diameter and two feet deep. – the pipe above marked j about one foot in length with a top made to shut perfectly tight. Another pipe leads also from the condensor through the side of cistern D which is referred to in the drawings by the figure 11. and is intended for the purpose of working a common air pump when necessary to keep the condenser always exhausted of air. A single steam engine will be sufficient to draw the water from the well at the same time to work the two force pumps and air pumps. As to the mode of operation.

The first thing to be done is to fill the boilers and cisterns and receiver with water or brine, If clear settled brine cannot be conveniently obtained

9507X for this purpose, common spring or other unimpregnated water will answer the purpose -
it being advisable not to use the salt water which has not been settled after boiling
unless indeed the salt water be free of impurities such as petroleum and the oxyde of
iron &c. which is not the case with that which I use. To this end water from a
spring or river may be thrown by the force pump up the pipe marked 9 into
cistern D., from thence it will pass down into boiler A. through the pipe marked
1. thence into the large cistern E[?], and through the cistern K, to cistern I,
From thence by the force pump it is raised through the pipe 8. into cistern
C, and passing through the stop cock marked 6. into boiler B, it descends into
the large receiver F and fills that. Thus all the cisterns as well as the boilers
are filled with water or brine. When this is effected the next step is to exhaust
the condenser, M., and to obtain a vacuum. To this end let the stop cocks
of the supply pipes, the vapour pipes and the discharge pipes be closed, close also
the stop cock of the long pipe leading from the condenser to the water box outside
the wall or furnace. Then opening the top of the short pipe leading from the top
of the condenser marked j. fill the condenser and its annexed pipes full of water
from the cistern D continue to pour in water until it runs over at the top of the
short pipe marked j. this being done close up the top of the short pipe j. perfect-
-ly tight, and open the stop cock in the water box marked k. the water in
the condenser and its pipes will sink down to about thirty two feet above the
level in the water box. the pressure of the air from without being equal to the
weight of a column of water of that height.
In this way the condenser will be an exhausted receiver, and the air pump
being put in operation will preserve it so. You may now open the stop cocks
of the vapour pipes, and build up the fires under the boilers, the door opening on
the grates being designated in the Drawings by the letter O. and the chimney
by the letter P. The column of water in the vapour pipes will not be
sufficient to derange the boilers or cisterns, or if any danger be apprehended, it
may be avoided by a safety valve on the boilers or cisterns. When the water
begins to boil the vapour will rise through the pipes into the condenser.
which being kept cold by the surrounding water will condense it immediately and
it will pass down the long pipe into the water box, and from thence out through the
aperture. The stream from which regulates the quantity to be admitted into the boiler through the supply pipe, the stop cocks of which ought not be opened until
about one third of the water in the boiler is evaporated; and then only in such quan
tities as not to increase the amount. A guide to this may be fixed in various
ways. A strong clear glass tube inserted in the upper ends of the cistern E and
the receiver F, on a level with the desired height of the water in the boiler
would serve the purpose. But no especial particularity is necessary.
Practice and attention to the state of the fires, and the stream of water from the
water box will soon render the regulator of but little use. Upon this plan then it
will be seen that the salt water is first conveyed into the cistern D, whence
it is conveyed into the boiler A here it is condensed and passing into the settling
cisterns deposits its impurities and comes into the last settling cistern I. (the
cisterns if necessary may be increased in number) thence it passes into cistern
C, and from that into the boiler B, where it is brought into such a condensed state
as to begin to form into chrystals. From this it goes into the receiver F where the
chrystals will continue to form and fall to the bottom, displacing the water or brine
gradually which rises into the boiler when the receiver is full. the stop cock
of the discharge pipe, is closed, and after opening the cock in the receiver marked
in the Drawings by the letter T in order to let off the bitter water &c the door
may be opened and the contents removed into the salt house.
The door in the large cistern E. is for the purpose of entering and cleaning it
when necessary. The receiver F ought to be made very large, so as that the
furnace might not blow out oftener than once a fortnight or longer. by this
mode of Manufacture there is a saving in fuel, a greater saving still in repair
and breaking of pans, and kettles, and the salt is almost if not entirely free
of all impurities. I have observed that the plan represented in the Draw-
ings supposes an elevation of the boilers about thirty two feet above the sur-
face. This is for convenience in the Model and the Drawing. It is by
no means necessary or desirable to so construct a furnace unless under circum-
stances which can rarely exist. What might seem to recommend it, is that it
removes the difficulty of overcoming the elevation requisite for the pipes annexed
to the condenser. were the boilers near the surface, and the vapour pipes eleva-
ted to the height of thirty feet, together with one of the supply pipes, when filled
with water, the weight of the column would burst both both boiler & cistern, if the stop cocks were opened, and they previously filled with water, even this difficulty however is readily obviated. The vapour pipes might be extended in a straight line above the boiler to the height of thirty two feet passing near the condenser, and reaching to the elevation of the short pipe above, being connected with the condenser by an elbow or stop cock, and left open at top.

After the boiler and cisterns are filled as before, the stop cocks of the vapour pipes and supply pipes closed a piston with a valve and close sliding box might be passed down the pipes to the stop cocks, and the pipes being filled with water up to the top as well as the condenser and its annexed pipe, the vacuum might be produced in all at the same time, by closing the top of the short pipe above the condenser, and opening the stop cock, in the water box as before, and at the same time drawing up the pistons in the vapour pipes, by pullies, until the sliding boxes passed the elbow or valve where they are connected with the condenser. In this way the water from the vapour pipes would pass from them into the condenser, and down the pipe into the water box, and the tops of all being shut up close the vapour pipes as well as the condenser would be exhausted receivers; and the cocks being open below the fire might be kindled immediately. This would be the best mode where the fuel was to be raised from below, and the ground would not allow of another and more convenient mode.

But where the surface is hilly, the best site is on the side or top of a hill, where no difficulty presents itself. The long pipe from the condenser is in such case carried down the hill to the necessary depth, Or in a level country it may be sunk in a well dug for the purpose, or conducted under ground to such a distance as may be necessary to procure the desired fall. In all these cases (and it can very rarely happen, that the plan in the drawing represented would be most advisable) the cisterns and receiver described as beneath the boiler may be either in front or in the rear, or at the sides as the builder chooses. The plan in the drawing is as I have said only for convenience and to illustrate the application of the principle. The thing most necessary to be observed by the builder is to have all the settling cisterns and receiver perfectly tight and strong whether he elevates his boiler or not. What I claim as my own invention

9507X not heretofore known or used, in the above described machine is the ap-
plication of the principle of evaporation in vacuo to the manufacture of
coarse and common salt. I claim to have invented the means of apply-
ing a known principle in physics to the new and useful purpose of salt-making
The machine described so far as its construction is peculiar to the purpose
above, I claim to be my own invention. The machine may be varied in
its construction and the principle applied in other modes, but I claim to be
the original inventor of the means of applying the principle of evaporation
in vacuo to the manufacture of coarse and common salt.

Witness { Wm. P. Elliot
B. K. Morsell }

Richard K. Cralle 3045 wds

Drawing

[illegible]